United States Patent Office 2,873,212
Patented Feb. 10, 1959

2,873,212

CARBOXYLIC-NITRILE-VINYL ETHER COATING COMPOSITIONS, PROCESS AND COATED PRODUCT

Gerald P. Roeser, Fallsington, Pa., assignor, by mesne assignments, to American-Marietta Company, Stoner-Mudge Co. Division, Chicago, Ill., a corporation of Illinois No Drawing. Application October 26, 1955
Serial No. 543,009

17 Claims. (Cl. 117—103)

This invention relates to resinous polymers, and to their use for sanitary protective coatings on containers on closures for foods and beverages, and other applications. This application is a continuation-in-part of my application Serial No. 269,326, filed January 31, 1952, now abandoned.

Sanitary coatings are required for successful packing of foods and beverages in containers. A coating for that purpose may be a single coating, or a finish, size or other coating in a series of successively baked on multiple coatings, and may be applied to a backplate, tinplate, aluminum or other metal surface on the interior or exterior of a container or closure for foods or beverages or the like. The commercial practice of reducing the thickness of tin coatings to a minimum increasingly places a premium on developing high quality coating composition which can protect the underlying steel base, since the steel base is more susceptible than tin to chemical attack, and must be protected against such attack wherever there might happen to be a break in the continuity of the tin coating. Among the important characteristics sought in sanitary coating compositions are solubility in common solvents, with low viscosity and good flow properties at substantial solids concentrations; thermal stability capable of withstanding high baking temperatures and successive bakings when multiple coatings are applied; dry adherence and flexibility when coated on metal sheets, so that the coating will adhere and not rupture when the sheet is precoated and subsequently fabricated into containers, closures or other articles; adherence under wet as well as dry conditions when coated on metal; the property of not imparting flavor to the contents of a container when used as an interior coating on the container or closure; and the ability to withstand the effects of pasteurization, sterilization and other forms of preservation by heat, such as steam processing, when used as an interior coating on a container or closure. The coating should also have sufficient thermal stability to withstand the heat of soldering operations on adjacent portions of the article on which it is coated. Although various known polymers have particularly good properties with respect to various ones of the above stated requirements, it is nevertheless recognized that it is difficult to develop coating compositions which achieve a satisfactory balance of the desired properties, and that it is particularly difficult to develop coatings which have (1) the useful qualities of insolubility and infusibility characteristic of thermosetting resins, and also (2) sufficient flexiblity, adherence and tenacity to survive intact when precoated on a metal sheet which is subsequently shaped and drawn, as in the case of fabrication into containers, closures or other articles.

The polymers of the invention provide sanitary coatings having an improved balance and combination of qualities, including flexibility and tenacity suited for fabrication, and insolubility and stability affording high chemical and heat resistance. The polymers of the invention are thermosetting per se, i. e., the application of heat cross-links the chains of the polymers, and thereby "sets" or cures the polymers, without the aid of any additional agent. Before they thermoset the polymers are fusible and soluble, so that they can readily be applied in solution, and after they thermoset the polymers become relatively insoluble and infusible, and chemically inert. A further characteristic of importance lies in the fact that metal surfaces coated with the cured polymers of the invention can be soldered together readily, without interference from the coating, as would be expected in the case of the usual baked-on coatings, especially those which are considered to be thermosetting.

The polymers of the invention consist of the following three components in the following proportions:

(1) Component A, in proportions of about 5–63 mole percent, consisting of the following alpha-beta ethylenically unsaturated carboxylic acids and anhydrides and mixtures thereof:

Acrylic acid
    Methacrylic acid
    Itaconic acid
    Crotonic acid
    Monobutyl maleate
    Monomethyl maleate
    Maleic anhydride
    Itaconic anhydride (2) Component B, in proportions of about 32–64 mole percent, consisting of the following alpha-beta unsaturated nitrile compounds and mixtures thereof:

Acrylonitrile
    Fumaronitrile (3) Component C, in proportions of about 2–38 mole percent, consisting of vinyl ethers and mixtures thereof; e. g.:

Methyl vinyl ether
    Ethyl vinyl ether
    n-Butyl vinyl ether
    Isobutyl vinyl ether
    2-ethyl hexyl vinyl ether
    Isooctyl vinyl ether
    n-Amyl vinyl ether
    n-Hexyl vinyl ether
    n-Octyl vinyl ether
    2-chloroethyl vinyl ether
    Trimethylnonyl vinyl ether
    Isodecyl vinyl ether
    Ethoxyethyl vinyl ether
    Butoxyethyl vinyl ether
    Butoxyethoxy ethyl vinyl ether The above proportional limits were determined on the basis of tests both inside and outside of the specified limits for the purpose of determining the ranges of proportions which produce successful sanitary coatings meeting the above described requirements. I have found the following adverse effects when the specified limits are exceeded (the test methods are described in a later portion of the specification):

(1) Component A: If desired substantially below 5 mole percent, there is evidently not enough cross-linking with component B, and tests for "process blush" become unsatisfactory.

(2) Component A: If increased substantially above 63 mole percent, the excess carboxylic acid content makes the coating too hydrophylic, and "process blush" tests become unsatisfactory; also, the viscosity is such as to require stronger solvents, and fabrication tests of the coating become unsatisfactory.

(3) Component B: If decreased substantially below 32 mole percent, there is evidently insufficient crosslinking with component A; specifically, "process blush" tests become unsatisfactory.

(4) Component B: If increased substantially above 64 mole percent, the polar attraction of the polymer chains evidently become too great; specifically, fabrication tests become unsatisfactory, and the viscosity becomes such as to require very strong solvents.

(5) Component C: If decreased substantially below 2 mole percent, the internal plasticizing action of component C evidently becomes too little; specifically, fabrication tests become unsatisfactory, and the viscosity becomes such as to require stronger solvents.

(6) Component C: If increased substantially above 38 mole percent, the other components A and B are evidently diluted excessively so that they do not crosslink and cure sufficiently, with the result that the coating tests in general become unsatisfactory, particularly "process blush" and acetone resistance.

The above-listed different species of the components A and B are substitutable for each other on a molar percentage basis for the purposes of the invention. The above-listed species of component C are also substitutable on a molar percentage basis, but for best results I prefer to use relatively large amounts of lower molecular weight species of component C and to substitute the higher vinyl ether for the lower vinyl ether on a weight percentage basis. Substituting in that manner produces more uniform results, since the higher vinyl ether tend to soften the polymer, and substituting on a weight basis has the effect of reducing the molar proportions as higher vinyl ethers are substituted, with a resultant offsetting of their softening effect.

The polymer of the invention is preferably produced with the aid of a catalyst in order to reduce the reaction time, but a catalyst is not essential to the reaction. Azodiisobutylronitrile is an example of a useful catalyst for the purpose, in proportions by weight of 0.5 to 5% of the combined weight of the components A, B and C. Other catalysts may be selected from known vinyl polymerizing catalysts, such as organic oxidizing agents which contain the peroxide linkage O—O, and azo compounds.

The temperature and pressure conditions for making the polymers of the invention are not precisely limited, but for practical purposes are in the range of —20° to 150° C. at atmospheric pressure. The time for making the polymers of the invention can vary from a few minutes to several days, depending on the temperature and pressure, the yield sought, and the catalyst used, if any. The temperature for curing applied films of the polymer can range, for practical purposes, from 250 to 600° F., with the time of cure varying inversely with the temperature. As the proportion of the above-mentioned component A is reduced, a higher temperature is necessary to thermoset the polymer in a given time period.

The polymers of the invention are preferably produced with the aid of a suitable solvent to lower the viscosity of the components as they polymerize and to obtain a good reaction producing a high yield of a uniform polymer, but the solvent is not essential to the reaction. Any solvent may be selected which is a good common solvent for the reactants in their original state, and for the completed polymer, and which does not prevent or enter into the polymer-producing reaction. Examples of such solvents are the following, including mixtures thereof: aromatic hydrocarbon solvents such as benzene, toluene and xylene, ethyl benzene, isopropyl benzene and commercial mixed aromatic hydrocarbon solvents (mixed with more active solvents when using lower molecular weight vinyl ether esters as component C); ether alcohols, such as ethylene glycol monobutyl ether, ethylene glycol monomethyl ether, ethylene glycol monoethyl ether, diethylene glycol monobutyl ether, diethylene glycol monomethyl ether, and diethylene glycol monoethyl ether; ketones, such as methyl ethyl ketone and methyl isobutyl ketone; and such solvents as cyclohexanone, diacetone alcohol, acetone, dimethyl formamide, ethyl acetate and butyl propionate.

Solvents suitable for use with the polymers of the invention to make coating compositions are any of those mentioned in the preceding paragraph, and others selected from those suitable for vinyl polymers in general, e. g., isophorone. I have found that an important advantage of the use of higher molecular weight vinyl ethers as component C lies in the fact that they permit the use of substantially larger proportions of aromatic hydrocarbon solvents in the solvent for purposes of forming coating compositions with desired qualities of viscosity and flow-out at given solids concentrations, than in the case when lower molecular weight vinyl ethers are used for component C. For example, the highest percentage concentration of any aromatic hydrocarbon solvent with isophorone for polymers with n-butyl vinyl ether as component C is about 85%, whereas as high as 100% may be used in such a solvent mixture with n-hexyl vinyl ether as component C. When thinned to the necessary degree with solvents such as those mentioned, the polymers of the invention may be applied by brushing, roller coating, spraying and other conventional means.

Illustrative examples of polymers embodying the invention are as follows:

EXAMPLE I

A mixture of 9 parts by weight of glacial acrylic acid, 53 parts of distilled acrylonitrile, 100 parts of distilled n-butyl vinyl ether, 162 parts of methyl ethyl ketone and 2.46 parts of azodiisobutyronitrile are refluxed at 80° F. for 10 hours. An 76% yield of polymer is obtained, having a viscosity of 18 seconds at 24% total solids in methyl ethylketone at 80° F. in No. 4 Ford cup. The polymer produced consists of 7 mole percent of acrylic acid, 58 mole percent of acrylonitrile, and 35 mole percent of n-butyl vinyl ether.

EXAMPLE II

A mixture of 25 parts by weight of glacial acrylic acid, 25 parts of distilled acrylonitrile, 50 parts of distilled n-butyl vinyl ether, 100 parts of methyl ethyl ketone, and 1.25 parts of azodiisobutyronitrile are refluxed at 80° F. for 24 hours. A 66% yield of polymer is obtained, having a viscosity of 16 seconds at 24% total solids in methyl ethyl ketone at 80° F. in #4 Ford cup. The polymer produced consists of 36 mole percent of acrylic acid, 48 mole percent of acrylonitrile, and 16 mole percent of n-butyl vinyl ether.

EXAMPLE III

A mixture of 6.2 parts by weight of glacial acrylic acid, 36.5 parts of distilled acrylonitrile, 107.3 parts of distilled isooctyl vinyl ether, 150 parts of methyl ethyl ketone, and 2.25 parts of azodiisobutyronitrile are refluxed at 80° F. for 24 hours. A 70% yield of polymer is obtained, having a viscosity of 16 seconds at 24% total solids in methyl ethyl ketone at 80° F. in #4 Ford cup. The polymer produced consists of 7 mole percent of acrylic acid, 59 mole percent of acrylonitrile, and 34 mole percent of isooctyl vinyl ether.

The excellent thermal stability of the polymers of the invention is illustrated by the fact that test coatings of the polymers of Examples I, II and III, applied without primer on blackplate, survive in good condition, as evidenced by substantially unchanged color, when baked for 24 hours at 400° F.

The following table shows the results of testing coatings of the polymer of Example I, and also the results of like tests on other polymers consisting of only two of the three constituents of the Example I polymer, in order to indicate the importance of having all three constituents in the polymer.

Table of test data

| | Polymer (Components in Parts by moles) | | | |
|---|---|---|---|---|
| | Example I | X | Y | Z |
| Polymer Components: | | | | |
| Acrylic acid (A) | 7 | 7 | 0 | 7 |
| Acrylonitrile (B) | 58 | 0 | 58 | 58 |
| n-butyl vinyl ether (C) | 35 | 35 | 35 | 0 |
| Percent total solids | 29 | 34 | 28 | 10 |
| Coated at 5 mg./sq. in. on unprimed specimens baked 10 min. at 400° F., and tested for: | | | | |
| (i) Dry adhesion (10 is perfect)— | | | | |
| on ETP | 10 | 10 | 10 | 10 |
| on BP | 10 | 10 | 10 | 10 |
| (ii) Acetone resistance (10 is perfect)— | | | | |
| on ETP | Insoluble | Soluble | Soluble | Insoluble |
| on BP | Insoluble | Soluble | Soluble | Insoluble |
| (iii) Fabrication (30 is perfect)— | | | | |
| on ETP | 24 | 5 | 25 | 5 |
| on BP | 26 | 8 | 26 | 10 |
| (iv) Process blush resistance (10 is perfect): | | | | |
| on ETP | 8 | 0 | 2 | 4 |
| on BP | 9 | 0 | 3 | 5 |
| (v) Process wet adhesion (10 is perfect): | | | | |
| on ETP | 10 | 0 | 10 | 0 |
| on BP | 10 | 0 | 10 | 0 |

The polymers used in the tests stated in the above table were dissolved in methyl ethyl ketone. After being dissolved in such solvent to the total solids stated in the table, each polymer had a viscosity of substantially 40 seconds in No. 4 Ford Cup at 80° F., and was roller coated on electrolytic tinplate (ETP) and blackplate (BP) specimens, which were unprimed. The specimens were baked as stated in the table, and were then tested. The test procedures are outlined as follows:

(i) Dry adhesion: The coated surface of the specimen is cross-hatched with a blade and then pressure-sensitive tape ("Sotch" tape) is applied and rapidly pulled off to determine whether any of the coating was removable.

(ii) Acetone resistance (insolubility): The coated surface of the specimen is wiped with an acetone-impregnated pad, to determine whether the coating is soluble or insoluble in acetone. This is a measure of the extent to which it has thermoset.

(iii) Fabrication: The coated specimen is fabricated into a can end or closure, and the specimen is then immersed in a copper sulfate solution for one minute to indicate any exposed metal. The coating is then inspected for adherence and continuity.

(iv) Process blush resistance: The coated specimen is treated with steam or hot water in an autoclave under pressure for a period of 30 minutes, and is then visually inspected for "blush," i. e., a whitening, blistering, spotting or dulling of the coating.

(v) Process wet adhesion: After treating and inspecting the coated specimen for process blush, the specimen is blotted dry and tested for adhesion in the same manner as stated above for dry adhesion.

Pigments, dyes, waxes and other non-reactants may be added to the composition of the invention for decorative purposes and the like, without otherwise materially affecting the significant characteristics of the composition. In addition, the polymer of the invention may be modified with additives to enhance special properties.

The preferred vinyl ethers for component C are listed above, but other vinyl ethers can be used, such as aryl vinyl ethers (e. g., phenyl vinyl ether), aryl alkyl vinyl ethers (e. g., benzyl vinyl ether), and cycloalkyl vinyl ethers (e. g., cyclohexyl vinyl ether).

While I have described present preferred embodiments of the invention and methods of practicing the same, it will be recognized that the invention is not limited thereto but may be otherwise variously embodied and practiced within the scope of the following claims.

I claim:

1. The process which comprises copolymerizing in solution in non-reactive organic solvent, monomer components A, B and C at a temperature in the range of −20° C. to 150° C. in the presence of a free-radical generating polymerization catalyst to obtain a copolymer which is soluble in said organic solvent and which is thermosetting per se, said components being in proportions in the copolymer of about 5–63 mol percent of component A, 32–64 mol percent of component B, and 2–38 mol percent of component C; and component A being a compound selected from the group consisting of acrylic acid, methacrylic acid, itaconic acid, crotonic acid, monobutyl maleate, monomethyl maleate, maleic anhydride and itaconic anhydride, and mixtures thereof; component B being a compound selected from the group consisting of acrylonitrile and fumaronitrile and mixtures thereof; and component C being an alkyl vinyl ether.

2. The process which comprises copolymerizing in solution in non-reactive organic solvent, monomer components A, B and C at a temperature in the range of −20° C. to 150° C. in the presence of a free-radical generating polymerization catalyst to obtain a copolymer which is soluble in said organic solvent and which is thermosetting per se, said components being in proportions in the copolymer of about 5–63 mol percent of component A, 32–64 mol percent of component B, and 2–38 mol percent of component C; and component A being a compound selected from the group consisting of acrylic acid, methacrylic acid, itaconic acid, crotonic acid, monobutyl maleate, monomethyl maleate, maleic anhydride and itaconic anhydride, and mixtures thereof; component B being a compound selected from the group consisting of acrylonitrile and fumaronitrile and mixtures thereof; and component C being a vinyl ether selected from the group consisting of methyl vinyl ether, ether vinyl ether, n-butyl vinyl ether, isobutyl vinyl ether, 2-ethyl hexyl vinyl ether, isooctyl vinyl ether, n-amyl vinyl ether, n-hexyl vinyl ether, n-octyl vinyl ether, 2-chloroethyl vinyl ether, trimethylnonyl vinyl ether, isodecyl vinyl ether, ethoxyethyl vinyl ether, butoxyethyl vinyl ether, butoxyethoxy ethyl vinyl ether, and mixtures thereof.

3. The process which comprises copolymerizing in solution in non-reactive organic solvent, at a temperature in the range of −20° C. to 150° C. and in the presence of a free-radical generating polymerization catalyst, acrylic acid, acrylonitrile and an alkyl vinyl ether to obtain a copolymer which is soluble in said organic solvent and which is thermosetting per se and which contains in the copolymer 5-63 mol percent of acrylic acid, 32-64 mol percent of acrylonitrile and 2-38 mol percent of said alkyl vinyl ether.

4. The process which comprises copolymerizing in solution in non-reactive organic solvent, at a temperature in the range of −20° C. to 150° C. and in the presence of a free-radical generating polymerization catalyst, methacrylic acid, acrylonitrile and an alkyl vinyl ether to obain a copolymer which is soluble in said organic solvent and which is thermosetting per se and which contains in the copolymer 5-63 mol percent of methacrylic acid, 32-64 mol percent of acrylonitrile and 2-38 mol percent of said alkyl vinyl ether.

5. The process which comprises copolymerizing in solution in non-reactive organic solvent, acrylic acid, acrylonitrile and n-butyl vinyl ether at a temperature in the range of −20° C. to 150° C. in the presence of a free-radical generating polymerization catalyst to obtain a copolymer which is soluble in said organic solvent and which is thermosetting per se, said monomer components being in proportions in the copolymer of about 5-63 mol percent of acrylic acid, 32-64 mol percent of acrylonitrile, and 2-38 mol percent of n-butyl vinyl ether.

6. The process of claim 5 in which said acrylic acid, acrylonitrile and n-butyl vinyl ether respectively are present in proportions in the copolymer of substantially 7, 58 and 35 mol percent, respectively.

7. The process which comprises copolymerizing in solution in non-reactive organic solvent, acrylic acid, acrylonitrile and isooctyl vinyl ether at a temperature in the range of −20° C. to 150° C. in the presence of a free-radical generating polymerization catalyst to obtain a copolymer which is soluble in said organic solvent and which is thermosetting per se, said monomer components being in proportions in the copolymer of about 5-63 mol percent of acrylic acid, 32-64 mol percent of acrylonitrile, and 2-38 mol percent of isooctyl vinyl ether.

8. The process of claim 7 in which said acrylic acid, acrylonitrile and isooctyl vinyl ether respectively are present in proportions in the copolymer of substantially 7, 59 and 34 mol percent, respectively.

9. A copolymer made according to the process of claim 1.

10. A solution comprising non-reactive organic solvent containing dissolved therein a copolymer made according to the process of claim 1.

11. The process of obtaining a durably adhesive protective covering on a metallic sheet which comprises coating said sheet with a copolymer made by copolymerizing in solution in non-reactive organic solvent components A, B and C at a temperature in the range of −20° C. to 150° C. in the presence of a free-radical generating polymerization catalyst to obtain a copolymer which is soluble in said organic solvent and which is thermosetting per se, said components being in proportions in the copolymer of about 5-63 mol percent of component A, 32-64 mol percent of component B, and 2-38 mol percent of component C, component A being a compound selected from the group consisting of acrylic acid, methacrylic acid, itaconic acid, crotonic acid, monobutyl maleate, monomethyl maleate, maleic anhydride and itaconic anhydride, and mixtures thereof; component B being a compound selected from the group consisting of acrylonitrile and fumaronitrile, and mixtures thereof; and component C being an alkyl vinyl ether; and thereafter heating the coated sheet to temperature in the range of 250° F. to 600° F. and converting the coating to the thermoset condition in the absence of any extraneous cross-linking agent.

12. The process of obtaining a durably adhesive protective covering on a metallic sheet which comprises coating said sheet with a copolymer made by copolymerizing in solution in non-reactive organic solvent components A, B and C at a temperature in the range of −20° C. to 150° C. in the presence of a free-radical generating polymerization catalyst to obtain a copolymer which is soluble in said organic solvent and which is thermosetting per se, said components being in proportions in the copolymer of about 5-63 mol percent of component A, 32-64 mol percent of component B, and 2-38 mol percent of component C, component A being a compound selected from the group consisting of acrylic acid, methacrylic acid, itaconic acid, crotonic acid, monobutyl maleate, monomethyl maleate, maleic anhydride and itaconic anhydride, and mixtures thereof; component B being a compound selected from the group consisting of acrylonitrile and fumaronitrile, and mixtures thereof; and component C being a vinyl ether selected from the group consisting of methyl vinyl ether, ethyl vinyl ether, n-butyl vinyl ether, isobutyl vinyl ether, 2-ethyl hexyl vinyl ether, isooctyl vinyl ether, n-amyl vinyl ether, n-hexyl vinyl ether, n-octyl vinyl ether, 2-chloroethyl vinyl ether, trimethylnonyl vinyl ether, isodecyl vinyl ether, ethoxyethyl vinyl ether, butoxyethyl vinyl ether, butoxyethoxy ethyl vinyl ether, and mixtures thereof; and thereafter heating the coated sheet to temperature in the range of 250° F. to 600° F. and converting the coating to the thermoset condition in the absence of any extraneous cross-linking agent.

13. The process of claim 11 in which the components A, B and C are acrylic acid, acrylonitrile and n-butyl vinyl ether, respectively.

14. The process of claim 11 in which the components A, B and C are acrylic acid, acrylonitrile and n-butyl vinyl ether, respectively, in proportions in the copolymer of substantially 7, 58 and 35 mol percent, respectively.

15. The process of claim 11 in which the components A, B and C are acrylic acid, acrylonitrile and isooctyl vinyl ether, respectively.

16. The process of claim 11 in which the said components A, B and C are acrylic acid, acrylonitrile and isooctyl vinyl ether, respectively, in proportions in the copolymer of substantially 7, 59 and 34 mol percent, respectively.

17. A coated metal article made by the process of claim 11.

References Cited in the file of this patent

UNITED STATES PATENTS

| | | |
|---|---|---|
| 1,981,102 | Hagedorn et al. | Nov. 20, 1934 |
| 2,417,294 | D'Alelio | Mar. 11, 1947 |
| 2,436,204 | D'Alelio | Feb. 17, 1948 |
| 2,436,926 | Jacobson | Mar. 2, 1948 |
| 2,759,910 | Milne et al. | Aug. 21, 1956 |